May 17, 1960

S. GILMAN 2,937,280

DETECTING APPARATUS

Filed Sept. 24, 1953

INVENTOR
SAMUEL GILMAN
BY
ATTORNEY

May 17, 1960 S. GILMAN 2,937,280
DETECTING APPARATUS
Filed Sept. 24, 1953 4 Sheets-Sheet 3

INVENTOR
SAMUEL GILMAN
BY
ATTORNEY

May 17, 1960

S. GILMAN 2,937,280

DETECTING APPARATUS

Filed Sept. 24, 1953

INVENTOR.
SAMUEL GILMAN

BY

ATTORNEY

_United States Patent Office_

2,937,280
Patented May 17, 1960

2,937,280
DETECTING APPARATUS
Samuel Gilman, Maplewood, N.J., assignor to American Machine & Foundry Co., a corporation of New Jersey
Application September 24, 1953, Serial No. 382,125
8 Claims. (Cl. 250—83.3)

This invention relates to methods and apparatus for detecting the condition of material such as tobacco or a cigarette rod in a cigarette making machine, and more particularly for a control device, wherein a radiation detector and a dielectric detector are used together to indicate the percentage of moisture in the material and for using the radiation detector as an overriding control for the dielectric detector.

There have been various types of detectors for cigarette machines developed up to the present. For one reason or another, they have had various shortcomings. The present detector compensates for these shortcomings so as to provide a more accurate detecting apparatus.

It is an object of this invention to provide a dielectric detector for measuring the condition of a cigarette rod and for employing a radiation detector as an overriding control for the dielectric detector.

Another object of this invention is to measure the condition of a cigarette rod simultaneously by means of a dielectric detector and a radiation detector, and then electronically computing the percent of moisture in the rod from these two measurements.

A further object of this invention is to measure the mass of a moving stream by means of a beta gauge and to measure the dielectric properties of the stream by means of a dielectric detector and to use these measurements to compute the percent of moisture in the cigarette rod.

Another object of this invention is to also provide a circuit for combining a dielectric detector with a radiation detector so as to eliminate the need for an overriding control for the dielectric detector.

A further object is to provide a device wherein the instantaneous signal variations of a dielectric detector are used to operate a defective cigarette rejector while the slowly varying signals from the radiation detector are used to operate a feed control without the need for an overriding control for the dielectric detector.

Another object of the invention is to combine dielectric and radiation detecting devices in such manner as to detect the condition of a stream of material.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 1:
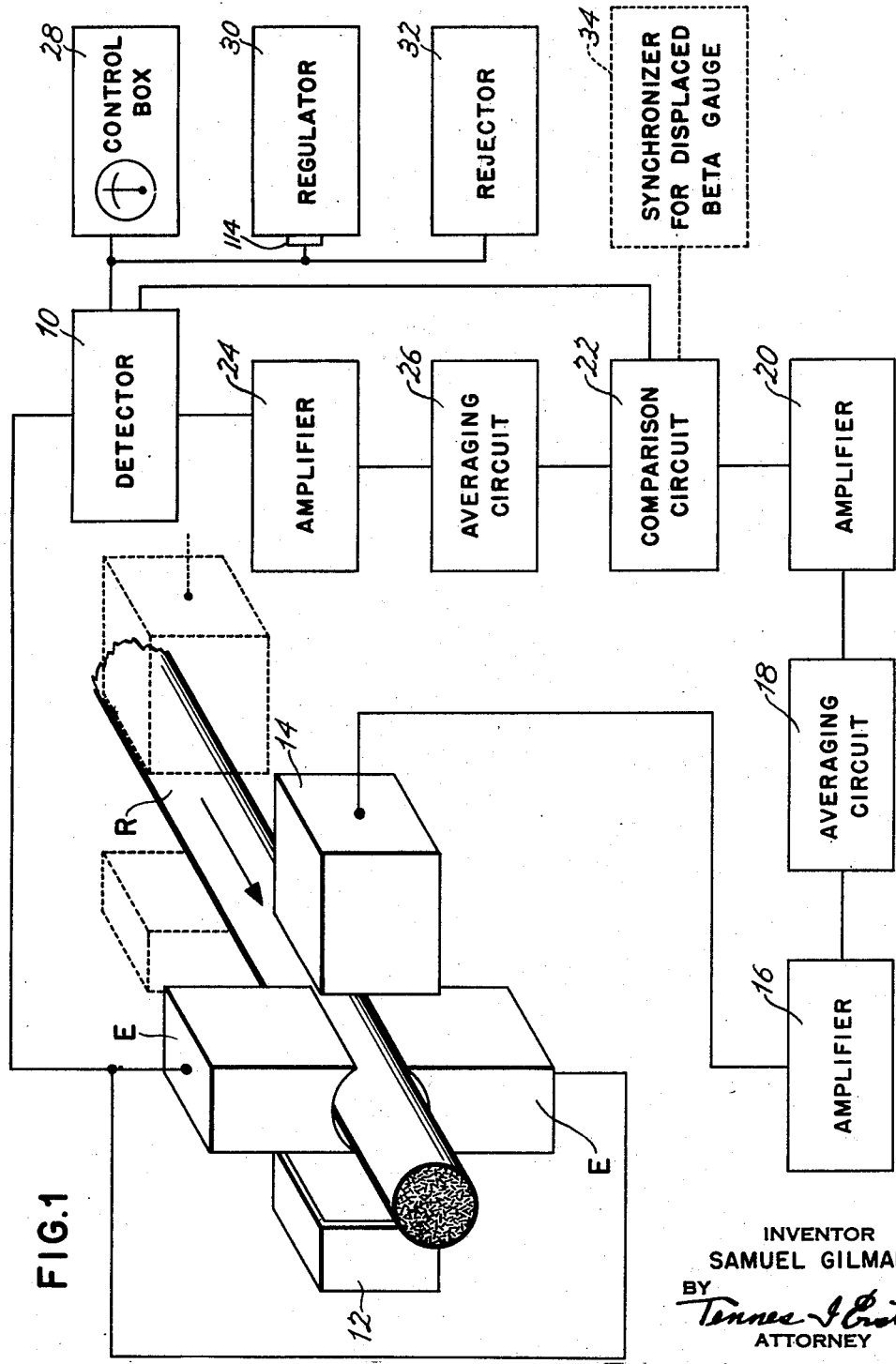
Fig. 1 is a diagrammatic representation of a combination of a radiation type measuring device and a dielectric detector illustrating a method and means for correcting a dielectric measurement for variations in moisture in a cigarette rod.

With reference to Fig. 1 the continuously moving cigarette rod R passes between two electrodes E which are connected to a dielectric detector 10. The latter may be the same type and of the same construction as the one shown and disclosed in Broekhuysen et al. Patent 2,729,214 or U. A. Whitaker Patent 2,357,860. Said electrodes E are mounted adjacent the top and bottom side of passing cigarette rod R.

A radiation type measuring device is mounted adjacent the vertical sides of said rod at approximately 90 degrees with respect to the electrodes E. While the radiation type measuring device may be either a beta gauge or a gamma gauge or X-rays, for purposes of illustrating the invention in Fig. 1 I have employed a beta gauge. The latter consists of a beta ray source 12 and a beta ray detector 14. The beta gauge has the advantages that it is substantially independent of difference in kind of material and depends primarily on the density of the material. For example, in the case of tobacco, water, and paper there would be no significant difference. Other types of radiation are dependent on the atomic number of the material as well as the density.

As shown in Fig. 1 the beta ray detector 14 is connected to amplifier 16 so that the output of said detector is transmitted to a suitable amplifier 16 which in turn is connected to an averaging circuit 18 and to another amplifier 20. The amplifier 20 amplifies and transmits the voltage or current output of the beta detector to an electronic comparison circuit 22 to which is also transmitted the amplified signal forwarded from the electrodes E through the dielectric detector 10, an amplifier 24 and an averaging circuit 26. Comparison circuit 22 may be a conventional adding circuit which algebraically adds the output voltages of amplifiers 20 and 24 respectively, or any other suitable circuit for comparing voltages, such as a balanced bridge circuit, may be used if desired.

Figure 3:
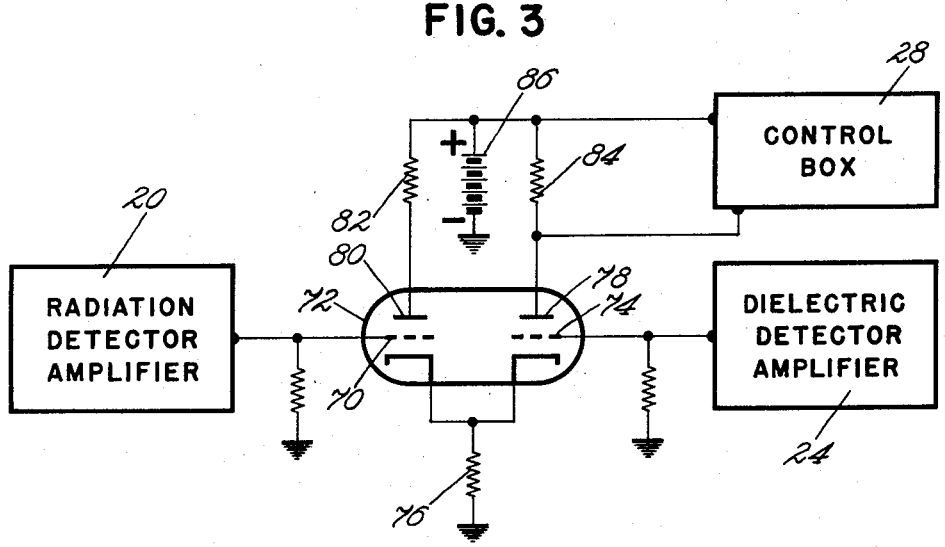
Fig. 3 is a wiring diagram showing an adding circuit for algebraically combining the outputs of the dielectric detector and the beta gauge.

For example, in Fig. 3 is shown a suitable adding circuit for combining the outputs of amplifiers 20 and 24. Connected to the grid 70 of one half of dual triode 72 is the output of beta gauge amplifier 20. Connected to the grid 74 of the other half of dual triode 72 is the output of dielectric detector amplifier 24.

The cathodes of both triode sections are connected together and return to ground by means of a common cathode biasing resistor 76. Anode voltage is supplied to anodes 78 and 80 through anode resistors 82 and 84 from a suitable source of D.C. voltage 86.

Since both cathodes of the dual triode are joined, the plate current of each separate triode section is influenced by the plate current flowing in the other section. Therefore signals impressed upon the grid of either section will cause a change in the plate current of the other triode section.

Figure 4:
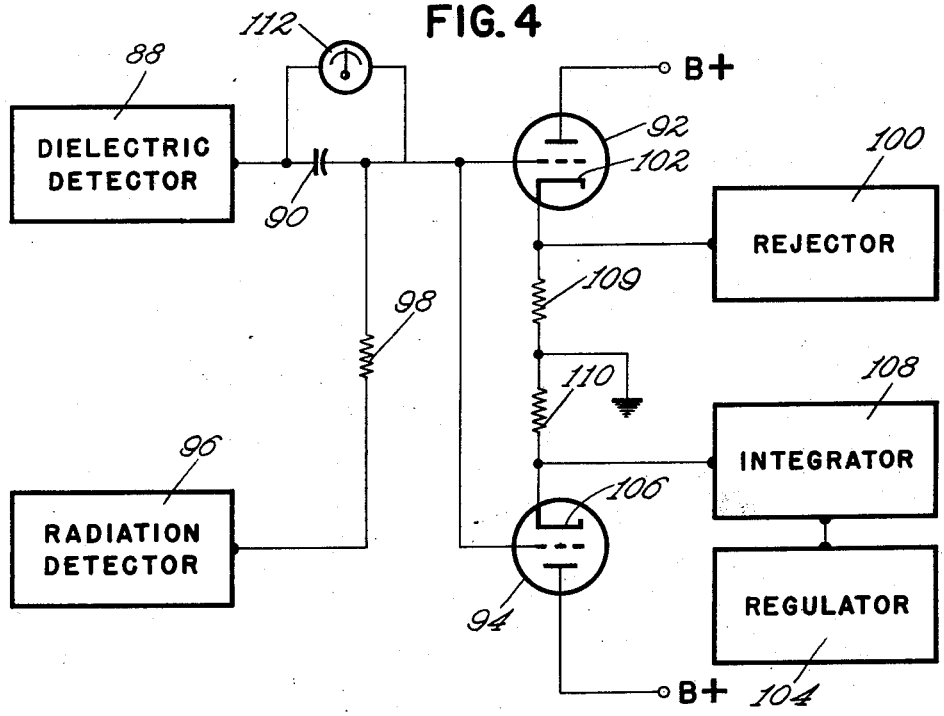
Fig. 4 is a wiring diagram of a circuit for providing an instantaneously varying signal for operating a rejecting device and a slowly varying signal for operating a feed control.

The outputs of amplifiers 20 and 24 are thereby added and the resulting addition may be obtained across either anode resistor 82 or 84. In Fig. 4 the output is shown as being obtained across resistor 84 and fed to control box 28.

Since the beta gauge detector 14 measures primarily the mass of the cigarette rod and the electrodes E and dielectric detector 10 measure the electric capacity or dielectric properties which in turn is greatly influenced by the moisture in the tobacco, an unfavorable and bad matching correlation of the two measurements or signals in the comparison circuit 22 will indicate that there has been a change in the moisture content.

By means of suitable electronic control circuits contained in control box 28, the setting of the dielectric detector referred to in Broekhuysen et al. Patent 2,729,-214, referred to above, and Gilman et al. Patent 2,745,-411, is automatically reset to zero to correct the dielectric detector so that it will correctly indicate the density of the tobacco stream or other material being detected.

By this correcting means the dielectric detector is held to a correct operating value for the short time averaging used to control the feed of the cigarette making machine as described in Broekhuysen et al. Patent 2,729,213 and for the instantaneous measurement used for rejection as described in Broekhuysen et al. Patent 2,729,214 referred to above.

We thus see that the dielectric detector measures the dielectric properties or electrical impedance of the cigarette rod which is influenced by the moisture in the tobacco, and the beta gauge measures the absorption of the cigarette rod which is substantially independent of the moisture in the tobacco. By averaging the absorption and the impedance measurement over a very long time (for example 20 to 30 seconds) by means of averaging circuits 18 and 26, it is possible to eliminate, to a major extent, the effects of the moisture in the tobacco on the electrical impedance.

Figure 6:
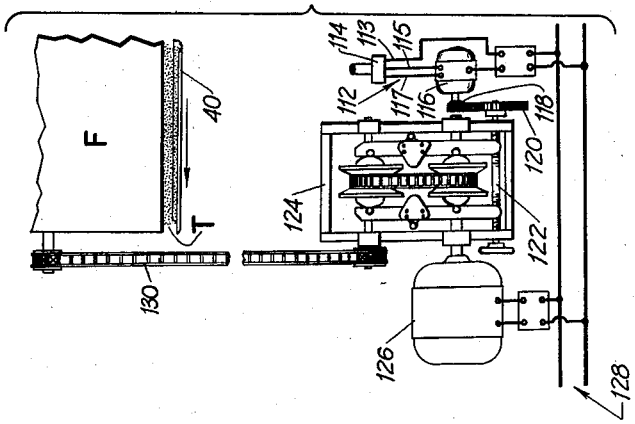
Fig. 6 is a schematic representation of a feed regulating mechanism used in connection with the embodiment of the invention shown in Fig. 1.

The dielectric detector 10 may also be connected to a tobacco feed regulator 30 of a cigarette machine such as shown and described in Broekhuysen et al. Patent 2,729,213 or Whitaker Patent 2,357,860, and also to the cigarette rejector 32 such as shown and described in Broekhuysen et al. Patent 2,729,214 or Whitaker Patent 2,357,860. The feed regulator shown and described in Whitaker Patent 2,357,860 is illustrated in Fig. 6 as having control leads generally indicated as 112, connected to plug 114 which in turn has a cable containing similar leads, connected to dielectric detector 10 (Fig. 1). Leads 112 control a reversible motor 116 on whose shaft is mounted a pinion 118 driving a gear 120 on the regulating screw shaft 122 of a variable speed transmission 124 such as the Reeves drive, fully described in Hawkins Patent 1,864,728, through which the motor 126 drives a conventional tobacco feed F. Motor 126 is connected to power lines 128 to which are also connected one terminal of motor 116 and a reversing lead 113. It will be understood that reversing leads 112 may be connected to a conventional double pole-single throw relay (not shown) which is adapted to be actuated by dielectric detector 10 in response to an increase or decrease in the density of the tobacco stream, in the manner described in Whitaker Patent 2,357,860. Changes in the density of the tobacco stream above or below a predetermined norm cause lead 113 to be connected to either lead 115 or 117, thus changing the direction of motor 116 as desired. Turning of the motor 116 in one direction will decrease and the other direction will increase the rate of feed of tobacco being showered on a moving belt or conveyor 40 by a proportional amount. Tobacco feed F is driven by a Reeves drive 124 through a chain 130.

In cases where it is difficult to locate the electrodes and the beta gauge around one particular point of the cigarette rod the radiation type measuring device may be longitudinally displaced with respect to the location of the electrodes as shown by dotted lines in Fig. 1. In such case a further time synchronizing circuit 34 may be included as indicated in dotted lines in Fig. 1.

Figure 2:
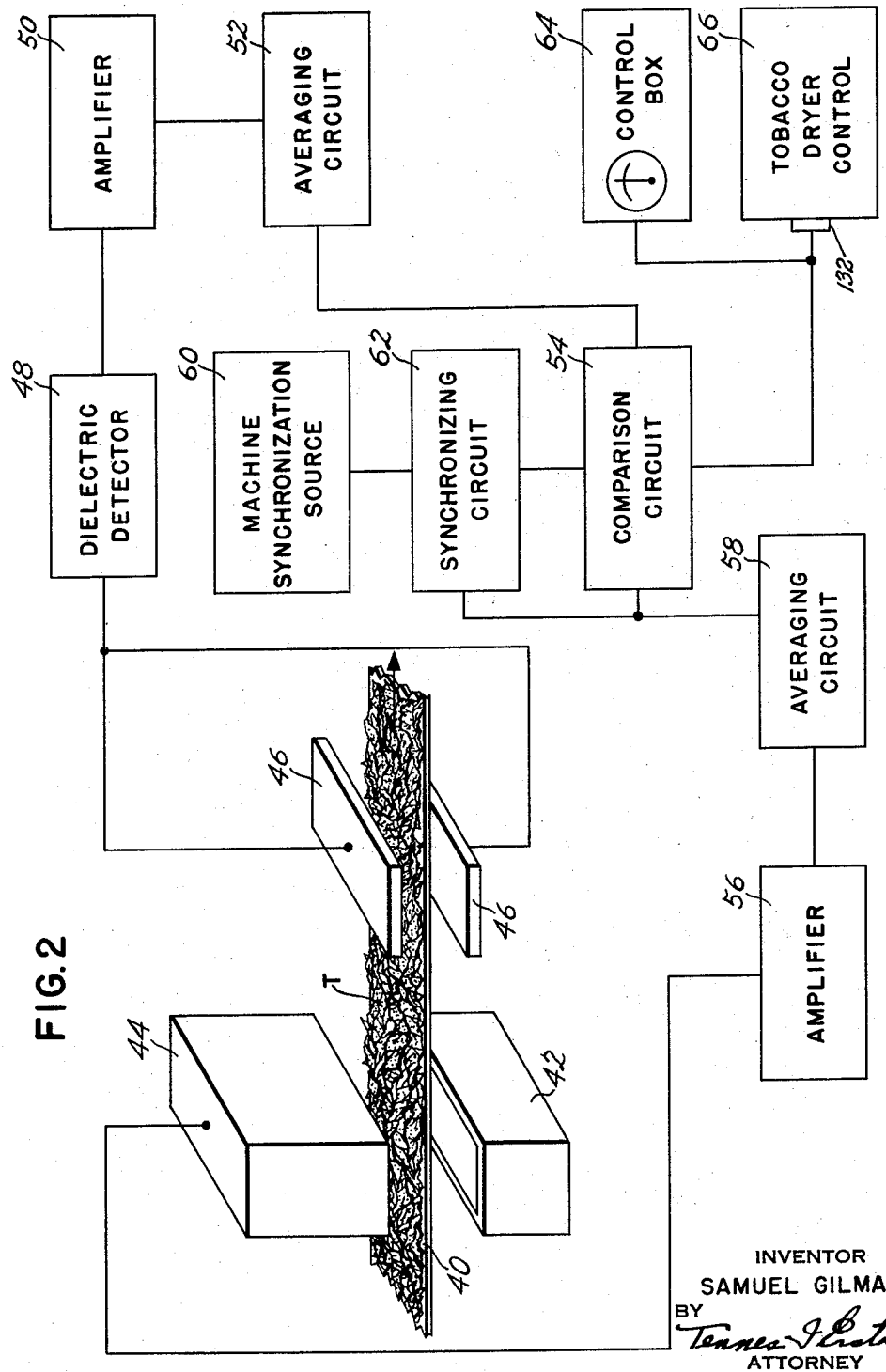
Fig. 2 is another diagrammatic representation of a combination of a radiation type measuring device and a dielectric detector illustrating a method and means for measuring the percentage of moisture of a moving stream of tobacco or similar article continuously.

Fig. 2 illustrates a possible construction whereby the percentage of moisture of tobacco or similar substance riding on a belt or moving conveyor 40 can be measured continuously. In this case the beta gauge, consisting of a beta source 42 and a beta detector 44 are mounted side by side with the electrodes 46 of the dielectric detector with a predetermined fixed space between the beta gauge and said electrodes. The latter, as illustrated in Fig. 2, are connected to a dielectric detector 48 which may be of the same type and construction as the one shown and described in Broekhuysen et al. Patent 2,729,214 referred to above.

The dielectric detector 48 in turn is connected to an amplifier 50 which amplifies and transmits the signals to an averaging circuit 52 which in turn is connected to a comparison circuit 54. The signal or output of the beta ray detector 44 is also connected to an amplifier 56 which amplifies and transmits said signal to an averaging circuit 58 which is also connected to the comparison circuit 54.

The measurements taken by the beta detector and the electrodes of the dielectric detector must be made on the same elements passing between them. This can be done by arranging the beta gauge and the dielectric detector in the manner shown in Fig. 1 so that simultaneous measurements are made on the same material. When the beta gauge and dielectric detector are arranged in the manner shown in Fig. 2, a machine synchronization source or mechanism 60 must be attached to the machine so that by a constant speed of the conveyor 40 at the time it takes the tobacco to travel from one measuring device to the other can be precisely defined and transmitted to a synchronization circuit 62 which in turn is connected to the comparison circuit 54.

Therefore, in this case, the weight of the tobacco measured by the beta gauge and the total moisture determined by the dielectric detector are combined not simultaneously but a definite time after the measurements are made. Since as mentioned heretofore, the beta gauge measures the mass and the dielectric detector essentially measures the total moisture within that mass, a proper combination of the two measurements in the comparison circuit will disclose directly the percentage of moisture.

Figure 5:
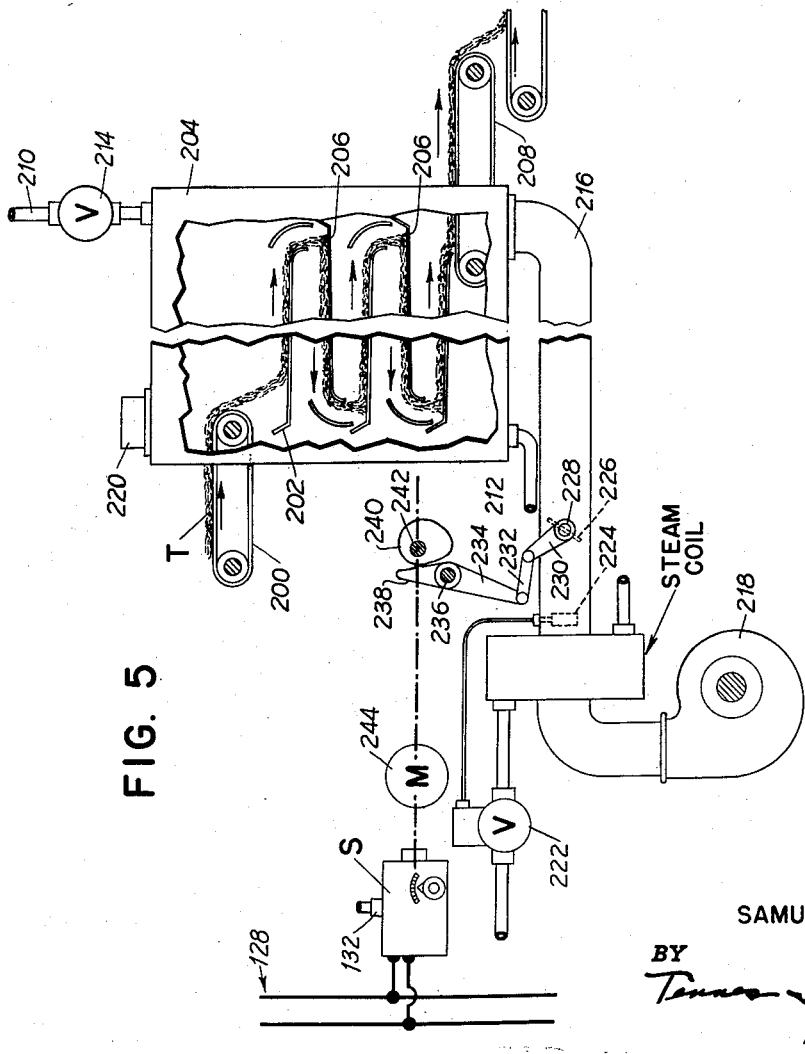
Fig. 5 is a schematic representation of a tobacco drying apparatus used in connection with the embodiment of the invention shown in Fig. 2.

This combination of measurements can be made either electronically through computing circuits which are relatively simple, or electrically, or in any other desired manner which gives the ratio of one measurement to the other. The comparison circuit 54 is also connected with a control box 64 containing a suitable automatic moisture correcting mechanism. The comparison circuit 54 may also be connected with a tobacco dryer control device 66 such as the drying mechanism shown in U.S. Patent 2,768,269, issued October 30, 1956, to J. A. Maul, so that the stream of tobacco after passing the detecting stations may be properly processed and dried to a desired moisture content by suitable drying apparatus. A portion of the tobacco dryer control shown and described in this patent is shown in Fig. 5 as having a continuously running, endless conveyor belt 200 which in turn deposits tobacco stream T onto a slightly inclined vibrator plate 202 suitably mounted and operated in a tobacco predryer housing 204. Oriented beneath vibrator plate 202 and beneath each other are a number of additional vibrator plates 206. Plates 206 are arranged and actuated in such a way that tobacco stream T delivered onto plate 202 is moved across the predryer housing 204 and then deposited onto the next vibrator plate 206. The tobacco stream T, by the vibrator action of plate 206, is moved again across the predryer housing and then fed onto the next vibrator plate therebelow. This conveying of the tobacco stream T back and forth within the housing 204 continues until the lowermost plate 206 deposits it onto another endless conveyor belt 208 which carries the tobacco stream out of predryer 204.

Within housing 204 are also mounted a number of suitably arranged steam pipes (not shown) all of which are connected to a suitable steam feed pipe 210 and an exhaust pipe 212. The feed pipe 210 is provided with a valve 214 which permits control of the amount of heat required for drying action within housing 204. Connected to the bottom portion of housing 204 is the end of a duct 216 which in turn is connected to a blower 218 employed for the purpose of providing a constant air flow as well as circulation of the air within housing 204. A vent 220 mounted on top of housing 204 serves as an exhaust for the air stream. In order to speed up drying operations within housing 204, the air stream forced therein by blower 218 may be heated by means of a suitable steam coil surrounding or penetrating a portion of tube 216. The amount of heat supplied by the steam coil to heat the air stream is regulated by a suitable modulator valve 222 which in turn may be automatically controlled by a thermostat 224 placed within duct 216.

In order to control the amount of heated air sent into housing 204, the duct 216 is provided with a damper 226. The latter is mounted on a shaft 228 to one end of which is secured a lever 230 which, by means of a link 232, is connected to an arm 234 pivotally mounted on a shaft 236. From the hub of arm 234 extends a cam lever 238 which due to the action of a suitable tension spring (not shown) contacts a suitable cam 240 mounted on a shaft 242 of a servo motor 244. The latter is actuated by a servo amplifier unit S.

The servo amplifier unit S in turn is connected to comparison circuit 54 and control box 64 by means of a cable connected to input plug 132. As the output of the comparison circuit measures directly the percentage of moisture as described above, this measurement results in a certain output or voltage which is transmitted to the servo amplifier unit S which in turn through its servo control motor 244 actuates the shaft 242 to thereby effect the proper seating of cam 240.

It is evident that the seating of the cams also influences the control and seating of the damper 226 in duct 216. Therefore, if the tobacco passing through the electrodes 46 has a high amount of moisture, the comparison circuit 54 reacts accordingly and transmits the corresponding signal to the servo amplifier unit S which then in turn seats the servo control cam 240 in a position which causes the damper 226 to open to the fullest extent, thus permitting a greater volume of heated air to be blown into the predryer housing 204 which increases the drying effect. If only a medium amount of moisture is contained in the tobacco, the damper plate 226 would then be set to a half-open position and the drying effect upon the tobacco within the housing 204 is accordingly less severe.

Fig. 4 shows another embodiment of the invention wherein instantaneous signal variations from the dielectric detector are used to operate a rejecting device, while slowly varying signals from the radiation detector are simultaneously used to operate a feed regulator similar to the regulator shown in Fig. 6, without the need of an overriding control for the dielectric detector. Dielectric detector 88 containing suitable amplifying and averaging circuits is connected through capacitor 90 to the interconnected grids of triode tubes 92 and 94. Radiation detector 96 containing suitable amplifying and averaging circuits is also connected to the grids of triodes 92 and 94 through resistor 98. Defective cigarette rejecting device 100 is connected to the cathode 102 of triode 92. Tobacco feed regulator 104 is connected to the cathode 106 of triode 94 through a suitable integrating circuit contained in box 108. Cathodes 102 and 106 are connected through cathode bias resistors 109 and 110 respectively to ground or B—. Since triodes 92 and 94 are connected in a cathode follower circuit the anodes of these tubes may be connected directly to a source of positive D.C. voltage designated in Fig. 4 as B+.

The operation of this circuit may be described briefly as follows: Dielectric detector 88, by means of suitable electrodes positioned adjacent to the path of travel of the material being detected, generates a rapidly varying voltage in a manner similar to that described in Broekhuysen et al. Patent 2,729,214 referred to above. The D.C. component of this signal is stripped or removed by a blocking capacitor 90 so that only the rapidly varying A.C. component of the signal is fed to interconnected grids of triodes 92 and 94. Radiation detector 96, and similar to that disclosed in Fig. 1, positioned adjacent to the path of travel of the material, generates a slowly varying voltage which passes through resistor 98 to the interconnected grids of the electronic tubes where it is mixed therein with the output of the dielectric detector and is used to provide a D.C. bias for electronic tubes 92 and 94.

Since the D.C. component has been removed from the output voltage of dielectric detector 88, no variations in the preset zero level of the dielectric detector will appear in the outputs of electronic tubes 92 and 94. Capacitor 90 and resistor 98 have values suitably chosen so that a time constant on the order of 20 to 30 seconds is provided. Due to the integrating effect of these RC circuit components, only slow variations in the output voltage of radiation detector 96 will be fed to the inputs of triodes 92 and 94, thereby providing a substantially constant control voltage, which serves as a D.C. or reference level voltage when combined with the output pulses of dielectric detector 88.

Fast-acting rejector 100 connected to the output of the cathode follower circuit having electronic tube 92 therein, is responsive to instantaneous variations in the composite output signal. The output of cathode follower circuit having electronic tube 94 therein is connected through an integrating circuit 108 to tobacco feed regulator 104 thereby allowing the regulator to be responsive only to the long time variations in the composite signal. Thus both a regulating and rejecting control voltage is obtained, without the necessity of an overriding control of the dielectric detector output.

Changes in the moisture percentage of the tobacco stream may be read directly by connecting a high resistance voltmeter 112 across the terminals of capacitor 90.

If the zero level of dielectric detector 88 is initially adjusted to coincide with the output of radiation detector 96, the voltage drop across capacitor 90 will be zero. Then any change in output voltage of the dielectric detector 88 caused by a change in the moisture content of the tobacco stream will result in a voltage difference across the terminals of capacitor 90, directly proportional to a change in moisture content. As meter 112, having a suitable averaging circuit included therein, and connected across capacitor 90 will be responsive to the average difference in D.C. level across the capacitor, it may thus be suitably calibrated to read percentage change in moisture directly. The voltage developed across capacitor 90 also may be utilized as a source of control voltage for any other units as may be desired, such as additional rejectors or servo mechanisms.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. In a machine for manufacturing material in a continuous stream, dielectric detecting means positioned adjacent the path of travel of said stream for generating a signal representative of changes in the dielectric properties of successive increments of said stream of material, a source of radiation positioned adjacent said path of travel, means for subjecting said increments of material to radiation from said source, radiation receiving means responsive to variations in radiation transmitted through said increments from said source for generating a signal representative of the mass of said successive increments of material, and means connected to said dielectric detecting means and said radiation receiving means for correlating said signals to generate a further signal representative of the moisture content of said increments of material.

2. In a machine for manufacturing material in a continuous stream, dielectric detecting means positioned adjacent the path of travel of said stream for generating a signal representative of changes in the dielectric properties of successive increments of said stream of material, a source of radiation positioned adjacent said path of travel, means for subjecting said increments of material to radiation from said source, radiation receiving means responsive to variations in radiation transmitted through said increments from said source for generating a signal representative of the mass of said successive increments of material, and electrical means connected to said dielectric detecting means and said radiation receiving means for algebraically adding said signals to generate a composite signal representative of the condition of said increments of material.

3. In a machine for manufacturing material in a continuous stream, dielectric detecting means positioned adjacent the path of travel of said stream for generating a signal representative of changes in the dielectric properties of successive increments of said stream of material, a source of radiation positioned adjacent said path of travel, means for subjecting said increments of material to radiation from said source, radiation receiving means responsive to variations in radiation transmitted through said increments from said source for generating a signal representative of the mass of said successive increments of material, electrical adding means connected to said dielectric detecting means and said radiation receiving means for algebraically adding said signals to generate a composite signal representative of the condition of said increments of material, and means connecting said adding means to said dielectric detecting means whereby said detecting means is adjusted in response to variations in said composite signal.

4. In a machine for manufacturing material in a continuous stream, dielectric detecting means positioned adjacent the path of travel of said stream for generating a first signal representative of changes in the dielectric properties of successive increments of said material, means for averaging said first signal to remove transient variations therefrom, a source of radiation positioned adjacent said path of travel, means for subjecting said increments of material to radiation from said source, raidation receiving means responsive to variations in radiation transmitted through said increments from said source for generating a second signal representative of the mass of said successive increments of material, means for averaging said second signal to remove transient variations therefrom, and means connected to said first signal averaging means and said second signal averaging means for correlating said averaged signals to generate a further signal representative of the moisture content of said increments of material.

5. A moisture control system for a machine which manufactures material in a continuous stream comprising a drying mechanism for drying said material, dielectric detecting means positioned adjacent the path of travel of said stream for generating a signal representative of changes in the dielectric properties of successive increments of said stream of material, a source of radiation positioned adjacent said path of travel, means for subjecting said increments of material to radiation from said source, radiation receiving means responsive to variations in radiation transmitted through said increments from said source for generating a signal representative of the mass of said successive increments of material, means connected to said dielectric detecting means and said radiation receiving means for correlating said signals to generate a composite signal representative of the moisture content of said increments of material, and means connected to said correlating means for actuating said material drying mechanism in response to variations in said composite signal whereby the moisture content of said material is maintained substantially constant.

6. A feed regulating system for a machine which manufactures material in a continuous stream comprising a feed regulating mechanism for regulating the velocity of said stream of material, dielectric detecting means positioned adjacent the path of travel of said stream for generating a signal representative of changes in the dielectric properties of successive increments of said stream of material, a source of radiation positioned adjacent said path of travel, means for subjecting said increments of material to radiation from said source, radiation receiving means responsive to variations in radiation transmitted through said increments from said source for generating a signal representative of the mass of said successive increments of material, means connected to said dielectric detecting means and said radiation receiving means for correlating said signals to generate a composite signal representative of the moisture content of said increments of material, means for integrating said composite signal to remove transient variations therefrom, and means connected to said integrating means for regulating said feed mechanism in response to variations in said composite signal, whereby the velocity of said stream is varied in accordance with the moisture content of said material.

7. In a machine for manufacturing material in a continuous stream, a dielectric detector positioned adjacent the path of travel of said stream operative to generate a signal representative of variations in the dielectric properties of said stream of material, a beta gauge positioned adjacent said path of travel operative to generate a signal representative of variations in the mass of said stream of material, means connected to said dielectric detector for removing the direct current component from said detector signal to provide an output signal having substantially only alternating current components, and means for mixing said beta gauge signal with said alternating current components of said dielectric detector signal to generate a composite signal having a substantially direct current portion representative of the mass of said material and an alternating current portion representative of the moisture content of said material.

8. In a machine for manufacturing material in a continuous stream, a dielectric detector positioned adjacent the path of travel of said stream operative to generate an electrical signal representative of variations in the dielectric properties of said stream of material, a beta gauge positioned adjacent said path of travel operative to generate an electrical signal representative of variations in the mass of said stream of material, and means connected to said dielectric detector and said beta gauge for correlating said signals to generate a composite electrical signal having components of separable frequencies, means selectively responsive to a predetermined amplitude of one of said signal components for actuating a material rejecting device, and means responsive to variations in the amplitude of another of said signal components for actuating a mechanism for regulating the velocity of said material stream.

References Cited in the file of this patent

UNITED STATES PATENTS

| | | |
|---|---|---|
| 2,357,860 | Whitaker | Sept. 12, 1944 |
| 2,488,269 | Clapp | Nov. 15, 1949 |
| 2,501,174 | Herzog | Mar. 21, 1950 |
| 2,519,089 | Whitaker | Aug. 15, 1950 |
| 2,704,079 | Molins et al. | Mar. 15, 1955 |
| 2,759,108 | Molins | Aug. 14, 1956 |

OTHER REFERENCES

Todhunto: Algebra for the Use of Colleges and Schools, London (Macmillan and Co.), 1881, pages 36 to 39.

"Noncontacting Beta-Ray Thickness Gage," Clapp et al., General Electric Review, March 1950, pages 31 to 34.